(12) United States Patent
Bostick et al.

(10) Patent No.: US 9,715,366 B2
(45) Date of Patent: Jul. 25, 2017

(54) DIGITAL MAP OF A PHYSICAL LOCATION BASED ON A USER'S FIELD OF INTEREST AND A SPECIFIC SOUND PATTERN

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/855,579

(22) Filed: Sep. 16, 2015

(65) Prior Publication Data
US 2017/0075646 A1 Mar. 16, 2017

(51) Int. Cl.
*G06F 3/16* (2006.01)
*G10L 25/51* (2013.01)
(Continued)

(52) U.S. Cl.
CPC .......... *G06F 3/165* (2013.01); *G06F 3/04842* (2013.01); *G10L 21/10* (2013.01); *G10L 25/51* (2013.01); *H04W 64/003* (2013.01)

(58) Field of Classification Search
CPC ....................................................... G06F 3/165
(Continued)

(56) References Cited

U.S. PATENT DOCUMENTS 5,945,985 A * 8/1999 Babin .................... G09B 27/08
715/209
6,471,649 B1 * 10/2002 Saccardo ................. A61B 8/00
348/65
(Continued)

FOREIGN PATENT DOCUMENTS

WO 2014113891 A1 7/2014
WO 2014185885 A1 11/2014

OTHER PUBLICATIONS

P. Hyman, "Augmented-Reality Glasses Bring Cloud Security Into Sharp Focus", ACM, Communications of the ACM, Jun. 2013, vol. 56, No. 6, pp. 18-20.
(Continued)

*Primary Examiner* — Gerald Gauthier
(74) *Attorney, Agent, or Firm* — Law Office of Jim Boice

(57) ABSTRACT

A computer-implemented method, system, and/or computer program product generates a digital map of a physical location based on a user's field of interest and local sounds. One or more processors receive a user's field of interest from a computing device used by a user. The processor(s) map the user's field of interest to a specific sound pattern, and retrieve a digital audio file from a sound capturing device. The sound capturing device generates the digital audio file and a physical location descriptor for captured sound. The processor(s) match the digital audio file to the specific sound pattern, and generate an icon that represents the specific sound pattern and the physical location at which the sound is captured. The icon is overlaid onto a digital map, which is sent to the computing device used by the user.

17 Claims, 4 Drawing Sheets

(51) Int. Cl.
*G10L 21/10* (2013.01)
*G06F 3/0484* (2013.01)
*H04W 64/00* (2009.01)

(58) Field of Classification Search
USPC .... 340/686.1, 10.1; 345/173, 419, 426, 629, 345/635; 348/14.08; 370/310; 381/302; 455/456.1, 566, 456.3; 600/437; 701/1, 701/438, 454, 533, 457, 465, 532; 704/231; 707/827, 752, 812; 709/203; 715/209, 709, 727, 753, 768, 738, 763, 715/771; 726/3; 705/26.62, 325; 718/100

See application file for complete search history.

(56) References Cited

U.S. PATENT DOCUMENTS

| | | | |
|---|---|---|---|
| 6,529,804 B1* | 3/2003 | Draggon | G01C 21/3664 340/425.5 |
| 7,710,826 B2 | 5/2010 | Jeong et al. | |
| 8,223,088 B1 | 7/2012 | Gomez et al. | |
| 8,433,344 B1* | 4/2013 | Virga | G01C 21/3461 455/457 |
| 8,700,320 B1* | 4/2014 | Teicher | G01C 21/343 340/995.24 |
| 9,007,301 B1 | 4/2015 | Raffle et al. | |
| 2008/0040678 A1* | 2/2008 | Crump | G06F 3/0481 715/763 |
| 2008/0120366 A1* | 5/2008 | Donovan | H04L 67/125 709/203 |
| 2008/0129528 A1* | 6/2008 | Guthrie | G09B 29/008 340/686.1 |
| 2008/0132243 A1* | 6/2008 | Spalink | G09B 29/106 455/456.1 |
| 2008/0162037 A1* | 7/2008 | Hasan Mahmoud | G01C 21/30 701/532 |
| 2008/0304431 A1* | 12/2008 | Karaoguz | H04M 1/72522 370/310 |
| 2009/0054768 A1* | 2/2009 | Halmann | A61B 8/468 600/437 |
| 2009/0119255 A1* | 5/2009 | Frank | G06F 17/3087 |
| 2010/0087230 A1* | 4/2010 | Peh | G06F 3/04817 455/566 |
| 2010/0142715 A1 | 6/2010 | Goldstein et al. | |
| 2010/0161215 A1* | 6/2010 | Karani | H04W 4/02 701/465 |
| 2010/0169781 A1* | 7/2010 | Graumann | G06F 3/011 715/727 |
| 2011/0004828 A1* | 1/2011 | Callicrate | G06F 17/30241 715/738 |
| 2011/0077852 A1* | 3/2011 | Ragavan | G01C 21/3682 701/533 |
| 2011/0141031 A1* | 6/2011 | McCullough | G06F 3/0481 345/173 |
| 2011/0165888 A1* | 7/2011 | Shuman | G06F 17/30041 455/456.1 |
| 2012/0075294 A1* | 3/2012 | Akifusa | G06F 1/1647 345/419 |
| 2012/0079562 A1* | 3/2012 | Anttila | G06F 21/51 726/3 |
| 2012/0260195 A1* | 10/2012 | Hon | G06F 17/30873 715/753 |
| 2012/0265438 A1* | 10/2012 | Yakali | G01C 21/3476 701/454 |
| 2012/0314018 A1* | 12/2012 | Wengrovitz | H04N 7/181 348/14.08 |
| 2013/0278631 A1 | 10/2013 | Border et al. | |
| 2013/0332837 A1 | 12/2013 | Jarvinen et al. | |
| 2014/0141812 A1* | 5/2014 | Cho | H04W 4/022 455/456.3 |
| 2014/0218394 A1* | 8/2014 | Hochmuth | G09G 5/377 345/629 |
| 2014/0258348 A1* | 9/2014 | Hafeez | G06F 17/30014 707/827 |
| 2014/0270182 A1 | 9/2014 | Vilermo et al. | |
| 2014/0274107 A1* | 9/2014 | Rados | G06F 17/30241 455/456.1 |
| 2014/0348353 A1* | 11/2014 | Christoph | H04R 3/12 381/302 |
| 2015/0006166 A1* | 1/2015 | Schmidt | G10L 15/30 704/231 |
| 2015/0089419 A1* | 3/2015 | Hwang | G06F 3/017 715/768 |
| 2015/0095773 A1* | 4/2015 | Gonsalves | G06F 3/0484 715/709 |
| 2015/0161424 A1* | 6/2015 | Nevid | G06Q 30/0259 340/10.1 |
| 2015/0189038 A1* | 7/2015 | Nourse | H04L 67/2847 709/203 |
| 2015/0204685 A1* | 7/2015 | Gearhart | G01C 21/36 701/533 |
| 2015/0234818 A1* | 8/2015 | Hochmuth | G06F 17/30017 707/752 |
| 2015/0234868 A1* | 8/2015 | Lavalaye | G06F 17/30312 707/812 |
| 2015/0377628 A1* | 12/2015 | Arokiaraj | G01C 21/367 701/532 |
| 2016/0071298 A1* | 3/2016 | Liu | G06T 3/40 345/635 |
| 2016/0104232 A1* | 4/2016 | Perks | G06Q 30/0631 705/26.62 |
| 2016/0302037 A1* | 10/2016 | Jack | H04W 4/023 |
| 2016/0308798 A1* | 10/2016 | Magistrado | H04L 51/046 |
| 2016/0379326 A1* | 12/2016 | Chan-Gove | G06Q 50/265 705/325 |
| 2017/0030731 A1* | 2/2017 | Thompson | G01C 21/3682 |

OTHER PUBLICATIONS

M. Stein et al., "Montreal Sound Map", www.montrealsoundmap.com, retrieved Apr. 15, 2015, 1 page.

G. Ouzounian, "Interactive Sound Maps Provide New Tools for Mapping Cities", New Statesman, City Metric, www.citymetric.com, Dec. 5, 2014, pp. 1-8.

J. Metcalfe, "Yo, I'm Trying to Sleep Here! New York's Wonderful Map of Noise", The Atlantic Monthly Group, CityLab, www.citylab.com, Apr. 15, 2013, pp. 1-5.

K. Agent et al., "Evaluation and Modification of the Traffic Noise Prediction Procedure for Kentucky Highways", Dept. of Transportation, Commonwealth of Kentucky, Division of Research, Bureau of Highways, Nov. 1974, pp. 1-15.

J. Dirksen, "Exploring the HTML5 Web Audio: Visualizing Sound", www.smartjava.org, Oct. 17, 2012, pp. 1-11.

* cited by examiner

DIGITAL MAP OF A PHYSICAL LOCATION BASED ON A USER'S FIELD OF INTEREST AND A SPECIFIC SOUND PATTERN

BACKGROUND

The present disclosure relates to the field of microphones, and specifically to the field of microphones that capture sounds of a specific sound pattern. Still more specifically, the present disclosure relates to the field of generating digital maps that utilize captured specific sound patterns.

SUMMARY

A computer-implemented method, system, and/or computer program product generates a digital map of a physical location based on a user's field of interest. One or more processors receive a user's field of interest from a computing device used by a user. The processor(s) map the user's field of interest to a specific sound pattern, and retrieve a digital audio file from a sound capturing device. The sound capturing device generates the digital audio file, and generates a physical location descriptor that identifies a physical location at which a sound used to generate the digital audio file by the sound capturing device is captured. The processor(s) match the digital audio file to the specific sound pattern, and generate an icon. The icon represents the specific sound pattern, as well as the physical location at which the sound used to generate the digital audio file by the sound capturing device is captured, and is used on a digital map according to the physical location descriptor. A transmitter transmits the digital map, with the icon displayed thereon, to the computing device used by the user.

DETAILED DESCRIPTION

Figure 1:
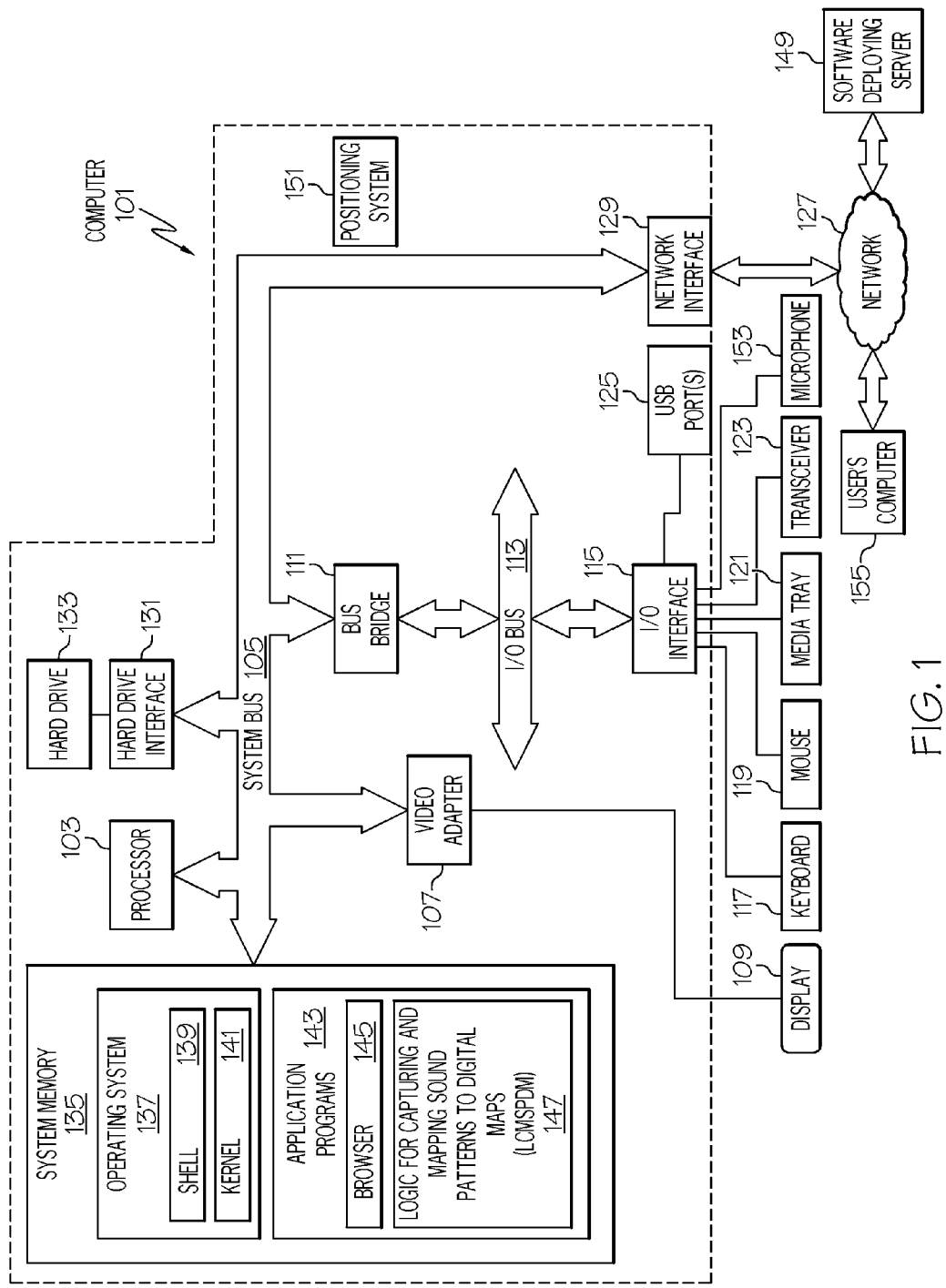
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or user's computer 155 shown in FIG. 1, and/or server 201, sound capturing devices 204a-204c, and/or user's computer 255 depicted in FIG. 2, and/or user's computer 355 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), external USB port(s) 125, and a microphone 153. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., user's computer 155) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Capturing and Mapping Sound Patterns to Digital Maps (LCMSPDM) 147. LCMSPDM 147 includes code for implementing the processes described below, including those described in FIGS. 2-4. In one embodiment, computer 101 is able to download LCMSPDM 147 from software deploying server 149, including in an on-demand basis, wherein the code in LCMSPDM 147 is not downloaded until needed for execution. In one embodiment of the present invention, software deploying server 149 performs all of the functions associated with the present invention (including execution of LCMSPDM 147), thus freeing computer 101 from having to use its own internal computing resources to execute LCMSPDM 147.

Also within computer 101 is a positioning system 151, which determines a real-time current location of computer 101 (particularly a location of microphone 153). Positioning system 151 may be a combination of accelerometers, speedometers, etc., or it may be a global positioning system (GPS) that utilizes space-based satellites to provide triangulated signals used to determine two or three dimensional locations.

Also associated with computer 101 is a microphone 153, which detects and captures sound energy. Microphone 153, along with processor 103, generates a digital audio file (which represents captured sound). Positioning system 151, along with processor 103, generates a physical location descriptor (e.g., a location file) that describes where the sound was captured. As described herein this digital audio file and this physical location descriptor are used to create an icon, which is overlaid onto a digital map, and which represents 1) the specific sound pattern for the captured sound, and 2) the physical location at which the sound was captured.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
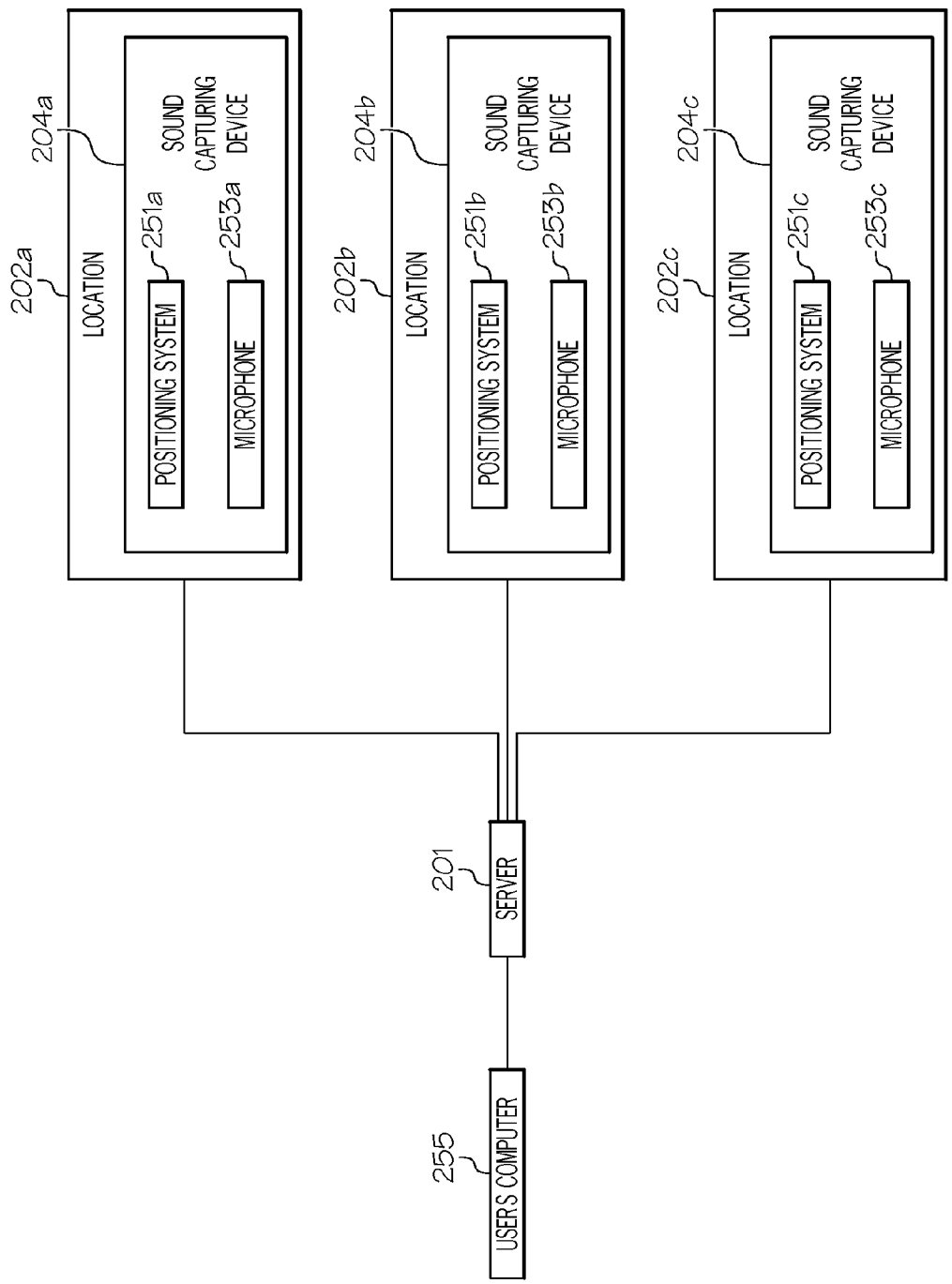
FIG. 2 illustrates a server monitoring multiple sound capturing devices in accordance with one or more embodiments of the present invention.

With reference now to FIG. 2, a server 201 (analogous to computer 101 shown in FIG. 1) is shown coupled to sound capturing devices 204a-204c (also analogous in architecture to computer 101 shown in FIG. 1), as well as to a user's computer 255 (analogous in architecture to computer 101 shown in FIG. 1), in accordance with one or more embodiments of the present invention.

Each of the sound capturing devices 204a-204c (where "c" is an integer) is at a unique location from locations 202a-202c. That is, each of the locations 202a-202c is a different physical location, and thus locations 202a-202c are likely to have different ambient sounds, which are captured by microphones 253a-253c (analogous to microphone 153 shown in FIG. 1).

For example, location 202a may be in the middle of a remote wilderness, as determined by positioning system 251a (analogous to positioning system 151 shown in FIG. 1). As such, microphone 253a is likely to capture the sound of songbirds, water streams, etc.

Location 202b may be at a music venue, as determined by positioning system 251b. As such, microphone 253b is likely to capture the sound of music.

Location 202c may be inside a sports arena, as determined by positioning system 251c. As such, microphone 253c is likely to capture the sound of spectators, athletes, etc.

The sounds captured by microphones 253a-253c are then used to provide information that is specific to a particular user's interest, which is represented on a digital map as described herein.

Figure 3:
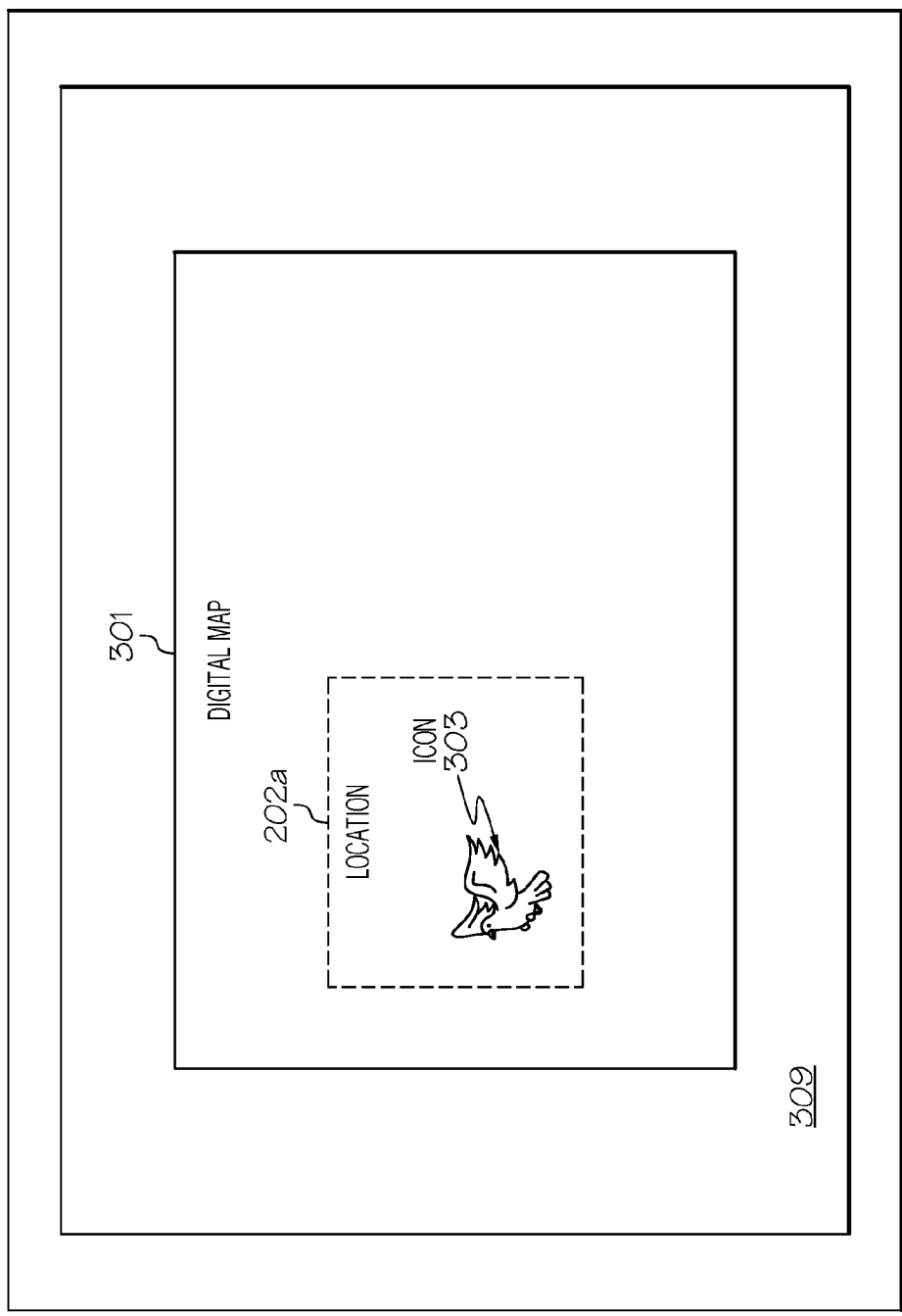
FIG. 3 depicts a digital map showing an icon that represents a type of sound and a location at which this type of sound occurs.

For example, consider the digital map 301 shown in FIG. 3. Digital map 301 is displayed on a display 309 (analogous to display 109 shown in FIG. 1) from a user's computer 355 (analogous to user's computer 155 shown in FIG. 1). Assume now that the position of location 202a shown in FIG. 2 is presented on digital map 301. Overlaid onto location 202a is an icon 303, which represents a type of sound that is captured by the microphone 253a shown in FIG. 2, as well as the location (as determined by positioning system 251a) at which this type of sound occurs (represented by the position of icon 303 on the digital map 301).

For example, continuing to assume for explanatory purposes that location 202a is in the middle of a remote wilderness, and microphone 253a has captured the sound of a particular songbird of interest to the user (an ornithologist). As such, icon 303 may be a pictorial image of this particular songbird, as shown in FIG. 3. The positioning of icon 303 on the digital map 301 shows where the song of this particular songbird may be heard.

If icon 303 is related to another subject such as music, then an icon showing a particular band that plays a certain genre of music may be used for the icon 303. Similarly, if icon 303 is related to a particular sport, then a ball (e.g., a basketball) may be used for the icon 303.

However it is represented, in one or more embodiments icon 303 can be activated. That is, by clicking a cursor over the icon 303, a digital audio file associated with the icon 303 can be played on the user's computer 355. Thus, if the particular songbird icon 303 is clicked, then sounds captured at location 202a that include those of that particular songbird are generated at the user's computer 355. Note that clicking icon 303 does not play a generic recording of that particular songbird. Rather, clicking icon 303 results in real-time streaming of sounds being captured by microphone 253a at location 202a to the user's computer 355.

Alternatively, clicking icon 303 results in the transmission (to user's computer 355) of previous recordings of sounds captured only at location 202a by microphone 253a.

In one or more embodiments of the present invention, such recordings are filtered, such that only the sounds of the particular songbird are sent to the user's computer 355. However, there may be times (e.g., at night) during which no songs from that particular songbird are captured or sent to the user's computer, since there are no songbirds of that particular type singing.

Thus, clicking icon 303 provides a "sound window" to location 202a, to either hear these particular songbirds currently singing, or alternatively, to hear these particular songbirds singing at location 202a in the past.

Figure 4:
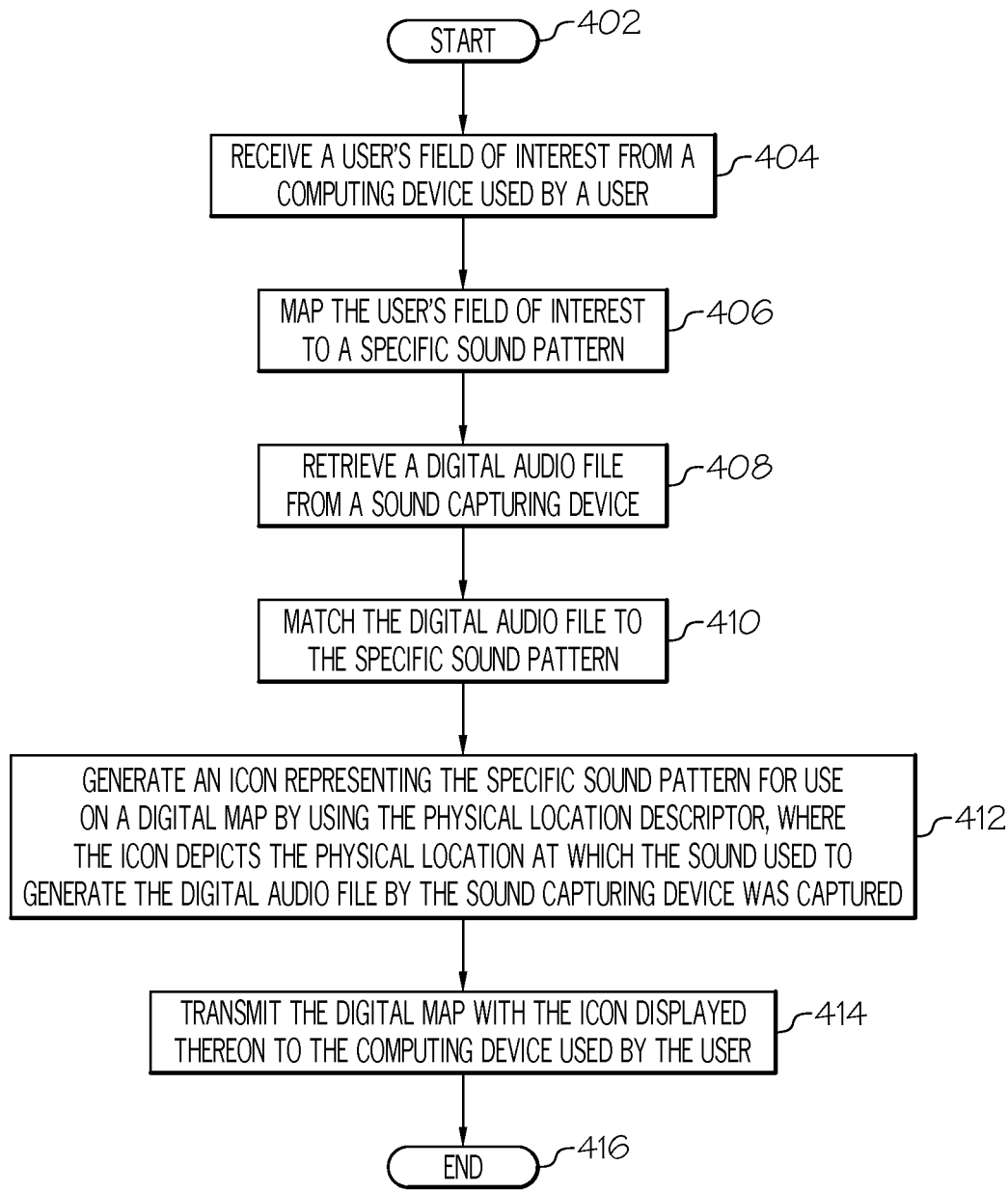
FIG. 4 is a high-level flow chart of one or more steps performed by one or more processors and/or other hardware to generate a digital map of a physical location based on a user's field of interest and local sounds at that physical location.

With reference now to FIG. 4, a high-level flow chart of one or more steps performed by one or more processors and/or other hardware to generate a digital map of a physical location based on a user's field of interest and local sounds at that physical location is presented.

After initiator block 402, one or more processors (e.g., within server 401 shown in FIG. 2) receive a user's field of interest from a computing device (e.g., user's computer 255 shown in FIG. 2) used by a user, as described in block 404. This field of interest may be entered by the user onto a user interface (e.g., by answering questions on a user interface), or they may be retrieved from a database storage device (e.g., hard drive 133 shown in FIG. 1) that holds a user profile for that particular user. For example, the user profile may indicate that this user is an amateur ornithologist who is interested in a particular songbird's habits, songs, etc.

As described in block 406, the processor(s) then map the user's field of interest to a specific sound pattern. Continuing with the example of the amateur ornithologist, the specific sound pattern may be of the particular songbird that this user is interested in. Thus, "ornithology", or more specifically "songs of songbird A" (the user's field of interest) are mapped to a specific sound pattern created by songbird A when it sings.

As described in block 408, the processor(s) then retrieve a digital audio file from a sound capturing device (e.g., sound capturing device 204*a*, which includes positioning system 251*a* and microphone 253*a*). The sound capturing device generates the digital audio file that is received (e.g., by the server 201). The sound capturing device generates a physical location descriptor (using readings from positioning system 251*a*) that identifies a physical location (e.g., location 202*a*) at which a sound used to generate the digital audio file by the sound capturing device is captured (e.g., using microphone 253*a*).

As described in block 410, the processor(s) then match the received digital audio file to the received specific sound pattern.

As described in block 412, in response to the digital audio file and the specific sound pattern matching, the processor(s) then generate an icon (e.g., icons 303 shown in FIG. 3). This icon represents the specific sound pattern (e.g., songs of a particular songbird, as captured by microphone 253*a*) for use on a digital map (e.g., digital map 301 shown in FIG. 3) according to the physical location descriptor (which was generated by sound capturing device 204*a* using readings from positioning system 251*a* shown in FIG. 2). By positioning the icon over a particular place on the digital map, the icon further depicts the physical location at which the sound used to generate the digital audio file by the sound capturing device is/was captured.

As described in block 414, a transmitter (e.g., transceiver 123 shown in FIG. 1, and part of server 201 shown in FIG. 2) transmits the digital map (e.g., digital map 301 shown in FIG. 3) with the icon (e.g., icon 303 shown in FIG. 3) displayed thereon to the computing device (e.g., user's computer 255 shown in FIG. 2) that is used by the user.

The flow-chart ends at terminator block 416.

Thus, by providing the user's field of interest to the server 201, the server 201 selectively pulls sound files from one of the sound capturing devices 204*a*-204*c*, and then creates a digital map showing where sounds relevant to that user's field of interest are occurring (or have occurred in the past), such that the user knows where the sound that he/she is interested in is occurring or has occurred.

In an embodiment of the present invention, the processor(s) receive a user input that activates the icon that is displayed on the digital map. For example, a user may click icon 303 shown in FIG. 3 (e.g., by placing a cursor over the icon 303 and clicking a mouse or other input device). In response to receiving the user input that activates the icon that is displayed on the digital map, the transmitter (e.g., transceiver 123 shown in FIG. 1, and part of server 201 shown in FIG. 2) transmits the digital audio file and execution instructions to the computing device used by the user to generate an audio output using the digital audio file. These execution instructions are executable, either autonomously or dependently.

For example, assume that the execution instructions that accompany the digital audio file are autonomous instructions. Thus, when the execution instructions are received by the user's computer, the digital audio file is automatically and immediately played on the user's computer using an audio driver found in the media tray 121 shown in FIG. 1 by executing the autonomous instructions.

However, if the execution instructions are dependent, then they are merely directions to a program in the user's computer (e.g., LCMSPDM 147 shown in FIG. 1) to handle the digital audio file, such that it can be played on the user's computer. Thus, in this embodiment, the execution instructions do not handle the details of how the digital audio file is used to produce sounds at the user's computer.

In an embodiment of the present invention, the digital audio file is retrieved from the sound capturing device in real time as the sound capturing device captures the sound. Then, when the user clicks on icon 303 shown in FIG. 3, the server 201 opens a channel between the user's computer 255 and the microphone 253*a*, which allows real-time sound files (either unprocessed, or else filtered such that only songs of the songbird of interest are allowed to be sent to the user's computer) to be sent to the user's computer 255.

Alternatively, clicking icon 303 may cause previously recorded sounds captured by microphone 253*a* to be retrieved according to the user's directions. For example, the user may enter preferences onto a user interface, directing the server 201 to retrieve sound recordings for a particular time of day, length of time, etc. that were created by microphone 253*a* at location 202*a*. These sound recordings may be further processed to filter out unwanted noise (e.g., any sound other than the songs of the songbird of interest).

In an embodiment of the present invention, the user's field of interest is ornithology, and the specific sound pattern is of a song from a bird of a particular species, as described in the example above. However, other user's fields of interest may also be utilized in various embodiments of the present invention.

For example and in one embodiment of the present invention, the user's field of interest is music, and the specific sound pattern is that of music of a particular music genre. That is, the user may be interested in pop music. Location 202*b* may be a music venue (e.g., a festival, a club, etc.) at which pop music is performed live. As such, the icon 303 shown in FIG. 3 will be an image suggesting this particular music genre, as well as where this type of music can be heard (e.g., is occurring now in real time, or has occurred in the past at times available by clicking the icon 303, which pulls up a history of when such music has been played at this location or else is scheduled to be played at this location).

In an embodiment of the present invention, the user's field of interest is nature, and the specific sound pattern is that of natural wind and water sounds. Thus, the user's field of interest is quiet natural surroundings. The server 201 matches this interest to the sounds being captured by microphone 253*a* at location 202*a* in FIG. 2, and places an icon 303 (representing natural scenery) on a position that identifies location 202*a* on the digital map 301 shown in FIG. 3.

In an embodiment of the present invention, the user's field of interest is sports, the specific sound pattern is that of sounds of athletic competition from an athletic field of play, and the physical location at which the sound is generated is a particular seat at the athletic field. For example, assume that a user is interest in hockey, which is played at location 202*c* (e.g., an arena) shown in FIG. 2. The microphone 253*c* may be aimed at a certain location in the stands, or even a specific seat, within the arena. When sitting close to the ice, sounds of the game of hockey are quite different from those heard in the upper decks. These sounds are provided to the user, allowing him/her to choose a seat that best suits his desire for a certain aural experience.

In an embodiment of the present invention, the user's field of interest is cinematography, and the specific sound pattern is of ambient sounds of a location at which a scene from a video/movie is being shot. For example, assume that script for a movie calls for an industrial location that has industrial sounds (e.g., machinery operating, gears grinding, etc.) in the background. That is, one location may have cranes running overhead, lathes in operation, etc. However, this location may have equipment that is so state-of-the-art that it makes little noise. However, another location also has cranes/lathes in operation, but these cranes/lathes are of older technological designs, and make the noise that is desired. The present invention directs a film maker to the second location, using the process described herein, according to the specific field of interest (i.e., a noisy industrial location) that has the specific sound pattern of machinery grinding, creaking, etc.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for generating a digital map of a physical location based on a user's field of interest, the computer-implemented method comprising:
   receiving, by one or more processors, a user's field of interest from a computing device used by a user;
   mapping, by one or more processors, the user's field of interest to a specific sound pattern;
   retrieving, by one or more processors, a digital audio file from a sound capturing device, wherein the sound capturing device generates the digital audio file, and wherein the sound capturing device generates a physical location descriptor that identifies a physical location at which a sound used to generate the digital audio file by the sound capturing device is captured;
   matching, by one or more processors, the digital audio file to the specific sound pattern;
   in response to the digital audio file and the specific sound pattern matching, generating, by one or more processors, an icon representing the specific sound pattern for use on a digital map according to the physical location descriptor, wherein the icon further depicts the physical location at which the sound used to generate the digital audio file by the sound capturing device is captured;
   transmitting, by a transmitter, the digital map with the icon displayed thereon to the computing device used by the user;
   receiving, by one or more processors, a user input that activates the icon that is displayed on the digital map; and
   in response to receiving the user input that activates the icon that is displayed on the digital map, transmitting, by the transmitter, the digital audio file and execution instructions to the computing device used by the user to generate an audio output using the digital audio file.

2. The computer-implemented method of claim 1, wherein the digital audio file is retrieved from the sound capturing device in real time as the sound capturing device captures the sound.

3. The computer-implemented method of claim 1, wherein the user's field of interest is ornithology, and wherein the specific sound pattern is of a song from a bird of a particular species.

4. The computer-implemented method of claim 1, wherein the user's field of interest is music, and wherein the specific sound pattern is that of music of a particular music genre.

5. The computer-implemented method of claim 1, wherein the user's field of interest is nature, and wherein the specific sound pattern is that of natural wind and water sounds.

6. The computer-implemented method of claim 1, wherein the user's field of interest is sports, wherein the specific sound pattern is that of sounds of athletic competition from an athletic field of play, and wherein the physical location at which the sound is generated is a particular seat at the athletic field.

7. A computer program product for generating a digital map of a physical location based on a user's field of interest, the computer program product comprising a non-transitory computer readable storage medium having program code embodied therewith, the program code readable and executable by a processor to perform a method comprising:
   receiving a user's field of interest from a computing device used by a user;
   mapping the user's field of interest to a specific sound pattern;
   retrieving a digital audio file from a sound capturing device, wherein the sound capturing device generates the digital audio file, and wherein the sound capturing device generates a physical location descriptor that identifies a physical location at which a sound used to generate the digital audio file by the sound capturing device is captured;
   matching the digital audio file to the specific sound pattern;
   in response to the digital audio file and the specific sound pattern matching, generating an icon representing the specific sound pattern for use on a digital map according to the physical location descriptor, wherein the icon further depicts the physical location at which the sound used to generate the digital audio file by the sound capturing device is captured;

transmitting the digital map with the icon displayed thereon to the computing device used by the use;

receiving a user input that activates the icon that is displayed on the digital map; and in response to receiving the user input that activates the icon that is displayed on the digital map, transmitting the digital audio file and execution instructions to the computing device used by the user to generate an audio output using the digital audio file.

8. The computer program product of claim 7, wherein the digital audio file is retrieved from the sound capturing device in real time as the sound capturing device captures the sound.

9. The computer program product of claim 7, wherein the user's field of interest is ornithology, and wherein the specific sound pattern is for a song from bird of a particular species.

10. The computer program product of claim 7, wherein the user's field of interest is music, and wherein the specific sound pattern is that of music of a particular music genre.

11. The computer program product of claim 7, wherein the user's field of interest is nature, and wherein the specific sound pattern is that of natural wind and water sounds.

12. The computer program product of claim 7, wherein the user's field of interest is sports, wherein the specific sound pattern is that of sounds of athletic competition from an athletic field of play, and wherein the physical location at which the sound is generated is a particular seat at the athletic field.

13. A computer system comprising:

a processor, a computer readable memory, and a non-transitory computer readable storage medium;

first program instructions to receive a user's field of interest from a computing device used by a user;

second program instructions to map the user's field of interest to a specific sound pattern;

third program instructions to retrieve a digital audio file from a sound capturing device, wherein the sound capturing device generates the digital audio file, and wherein the sound capturing device generates a physical location descriptor that identifies a physical location at which a sound used to generate the digital audio file by the sound capturing device is captured;

fourth program instructions to match the digital audio file to the specific sound pattern;

fifth program instructions to, in response to the digital audio file and the specific sound pattern matching, generate an icon representing the specific sound pattern for use on a digital map according to the physical location descriptor, wherein the icon further depicts the physical location at which the sound used to generate the digital audio file by the sound capturing device is captured;

sixth program instructions to transmit the digital map with the icon displayed thereon to the computing device used by the user;

seventh program instructions to receive a user input that activates the icon that is displayed on the digital map; and eighth program instructions to, in response to receiving the user input that activates the icon that is displayed on the digital map, transmit the digital audio file and execution instructions to the computing device used by the user to generate an audio output using the digital audio file; and wherein the first, second, third, fourth, fifth, sixth, seventh, and eighth program instructions are stored on the non-transitory computer readable storage medium for execution by one or more processors via the computer readable memory.

14. The computer system of claim 13, wherein the digital audio file is retrieved from the sound capturing device in real time as the sound capturing device captures the sound.

15. The computer system of claim 13, wherein the user's field of interest is ornithology, and wherein the specific sound pattern is of a song from a bird of a particular species.

16. The computer system of claim 13, wherein the user's field of interest is music, and wherein the specific sound pattern is that of music of a particular music genre.

17. The computer system of claim 13, wherein the user's field of interest is sports, wherein the specific sound pattern is that of sounds of athletic competition from an athletic field of play, and wherein the physical location at which the sound is generated is a particular seat at the athletic field.

* * * * *